(12) United States Patent
Scott et al.

(10) Patent No.: US 11,427,204 B2
(45) Date of Patent: Aug. 30, 2022

(54) CONTROL TO MITIGATE OPERATOR ABUSE OF DRIVETRAIN ON GRADE

(71) Applicant: Caterpillar Inc., Peoria, IL (US)

(72) Inventors: Austin J. Scott, Naperville, IL (US);
Jeffrey K. Berry, Yorkville, IL (US);
Amanda C. Doolittle, Peoria, IL (US);
Bryan K. Schache, Dunlap, IL (US);
Sameer S. Marathe, Frisco, TX (US);
Subrat S. Kamat, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 392 days.

(21) Appl. No.: 16/776,171

(22) Filed: Jan. 29, 2020

(65) Prior Publication Data

US 2021/0229671 A1    Jul. 29, 2021

(51) Int. Cl.
| | |
|---|---|
| *B60W 40/076* | (2012.01) |
| *B60W 40/09* | (2012.01) |
| *B60W 10/02* | (2006.01) |
| *B60W 50/08* | (2020.01) |
| *B60W 50/12* | (2012.01) |
| *B60W 10/184* | (2012.01) |
| *B60K 28/16* | (2006.01) |
| *B60W 50/00* | (2006.01) |
| *B60W 30/186* | (2012.01) |

(52) U.S. Cl.
CPC ........ *B60W 40/076* (2013.01); *B60W 10/026* (2013.01); *B60W 10/0235* (2020.02); *B60W 10/184* (2013.01); *B60W 40/09* (2013.01); *B60W 50/082* (2013.01); *B60W 50/12* (2013.01); *B60K 28/165* (2013.01); *B60W 30/186* (2013.01); *B60W 2050/0071* (2013.01); *B60W 2300/17* (2013.01); *B60W 2540/14* (2013.01); *B60W 2552/15* (2020.02)

(58) Field of Classification Search
None
See application file for complete search history.

(56) References Cited

U.S. PATENT DOCUMENTS

| | | | |
|---|---|---|---|
| 4,662,491 | A | 5/1987 | Takefuta et al. |
| 5,020,645 | A | 6/1991 | Sasa |
| 7,206,682 | B2 | 4/2007 | Bodin et al. |
| 2016/0236688 | A1* | 8/2016 | Mei ................. B60W 30/146 |

FOREIGN PATENT DOCUMENTS

| | | | | |
|---|---|---|---|---|
| FR | 3043379 A1 | * | 5/2017 | |
| WO | WO-2012032639 A1 | * | 3/2012 | .......... B60W 10/026 |
| WO | 2012105527 | | 8/2012 | |

* cited by examiner

*Primary Examiner* — Dirk Wright
(74) *Attorney, Agent, or Firm* — Schwegman, Lundberg & Woessner

(57) ABSTRACT

A method for mitigating powertrain abuse on a grade can include determining the grade a machine is on, the machine including an impeller clutch located between an engine and a powertrain so as to connect and disconnect engine power from the powertrain; and if the grade is over a threshold, a controller ignores any operator input to the impeller clutch such that machine speed retarding is utilized to keep the machine at a proper speed.

20 Claims, 4 Drawing Sheets

CONTROL TO MITIGATE OPERATOR ABUSE OF DRIVETRAIN ON GRADE

TECHNICAL FIELD

The present disclosure generally relates to heavy machinery. More particularly, the present disclosure relates to a control system for the machinery.

BACKGROUND

Some heavy machinery, for example, agricultural, industrial, construction or other heavy machinery include systems for slowing the rate of travel of the machine without application of the brakes. An example of such systems/functions is sometimes referred to as engine braking, which is only one type of what may be more generally referred to as a speed retarder system.

However, some operators may try to bypass these speed retarder systems in certain situations, such as on a grade, which can lead to abuse of the machinery.

U.S. Pat. No. 7,206,682 discusses a control system that uses a controller which uses the state of the slope to determine clutching characteristics of the vehicle.

SUMMARY

In an example, according to this disclosure, a method for mitigating powertrain abuse on a grade can include determining the grade a machine is on, the machine including an impeller clutch located between an engine and a powertrain so as to connect and disconnect engine power from the powertrain; and if the grade is over a threshold, a controller ignores any operator input to the impeller clutch such that machine speed retarding is utilized to keep the machine at a proper speed.

In one example, a system to mitigate powertrain abuse on a machine can include a controller associated with the machine, the machine including an impeller clutch located between an engine and a powertrain so as to connect and disconnect engine power from the powertrain, the impeller clutch controlled by an impeller clutch pedal; and a grade sensor coupled to the controller; wherein the controller is configured such that if the grade is over a threshold, the controller ignores any operator input to the impeller clutch pedal such that the impeller clutch does not slip and machine speed retarding is utilized to keep the machine at a proper speed.

In one example, a machine can include a frame; an engine coupled to the frame; a powertrain coupled to the frame; an impeller clutch located between the engine and the powertrain; a grade sensor configured to measure a grade at which the machine is disposed; and a controller in electrical communication the grade sensor, the controller determining if the grade is over a threshold, wherein the controller ignores any operator input to the impeller clutch such that machine speed retarding is utilized to keep the machine at a proper speed.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
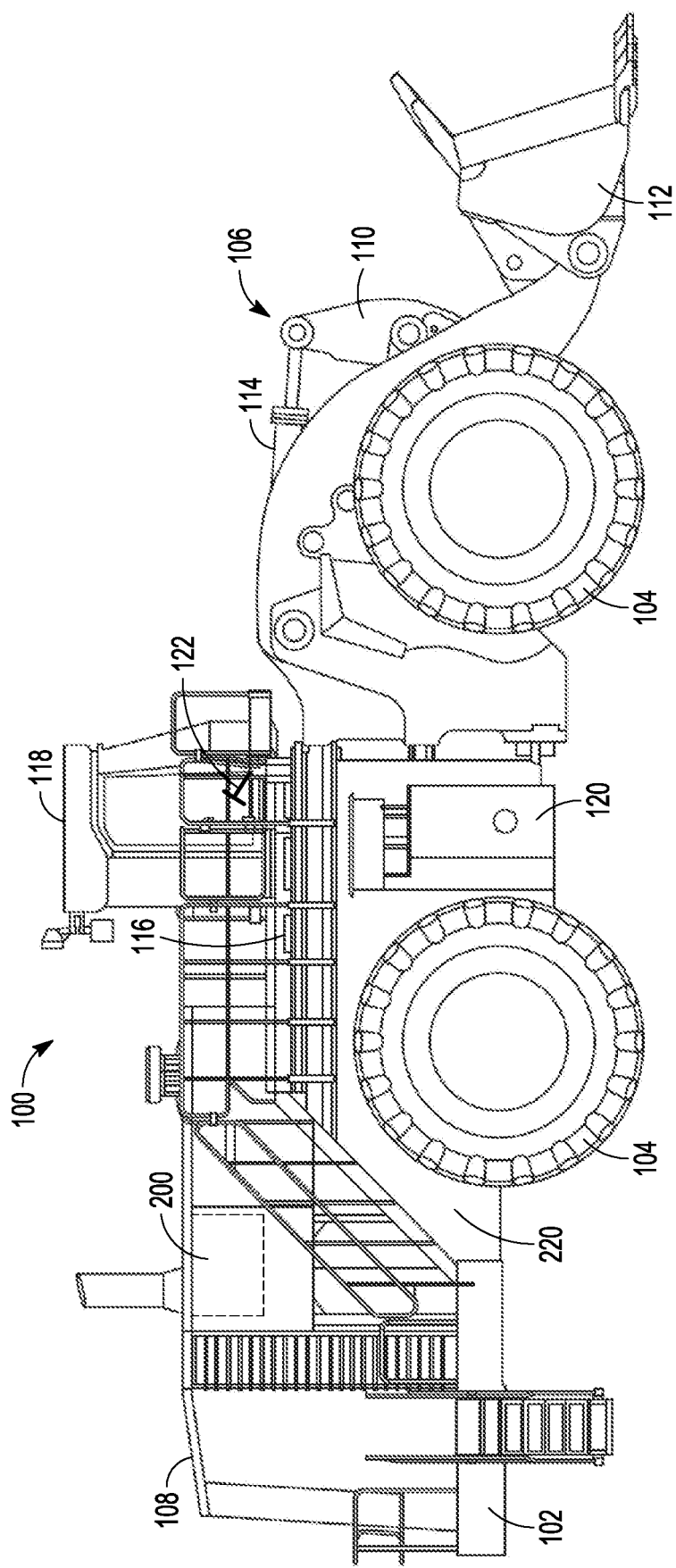
FIG. 1 is side view depicting an example machine in accordance with this disclosure.

FIG. 1 depicts an example machine 100 in accordance with this disclosure. In FIG. 1, machine 100 includes frame 102, wheels 104, implement 106, and a controller implemented in one or more on-board electronic devices like, for example, an electronic control unit or ECU. Example machine 100 is a wheel loader. In other examples, however, the machine may be other types of machines related to various industries, including, as examples, construction, agriculture, forestry, transportation, material handling, waste management, and so on. Accordingly, although a number of examples are described with reference to a wheel loader machine, examples according to this disclosure are also applicable to other types of machines including graders, scrapers, dozers, excavators, compactors, material haulers like dump trucks, along with other example machine types.

Machine 100 includes the frame 102 mounted on four wheels 104, although, in other examples, the machine could have more than four wheels. Frame 102 is configured to support and/or mount one or more components of machine 100. For example, machine 100 includes enclosure 108 coupled to frame 102. Enclosure 108 can house, among other components, an engine 200 and/or other drive system to propel the machine over various terrain though a powertrain 220 via wheels 106. The engine 200 can include various power generation platforms, including, for example, an internal combustion engine, whether gasoline or diesel.

Machine 100 includes implement 106 coupled to the frame 102 through linkage assembly 110, which is configured to be actuated to articulate bucket 112 of implement 110. Bucket 112 of implement 106 may be configured to transfer material such as, soil or debris, from one location to another. Linkage assembly 110 can include one or more cylinders 114 configured to be actuated hydraulically or pneumatically, for example, to articulate bucket 112. For example, linkage assembly 110 can be actuated by cylinders 114 to raise and lower and/or rotate bucket 112 relative to frame 102 of machine 100.

Platform 116 is coupled to frame 102 and provides access to various locations on machine 100 for operational and/or maintenance purposes. Machine 100 also includes an operator cabin 118, which can be open or enclosed and may be accessed via platform 114. Operator cabin 118 may include one or more control devices (not shown) such as, a joystick, a steering wheel, pedals, levers, buttons, switches, among other examples. The control devices are configured to enable the operator to control machine 100 and/or the implement 106. Operator cabin 118 may also include an operator interface such as, a display device, a sound source, a light source, or a combination thereof. The machine 100 includes an impeller clutch pedal 122 that controls an impeller clutch of the machine 100, as will be discussed below.

Machine 100 can include a tank compartment connected to frame 102 and including fuel tank 120. Fuel tank 120 is fluidly coupled to the engine. Tank 120 is configured to store a fuel therein and serve as a source for supply of the fuel to the engine of machine 100. Machine 100 may also include other tanks, for example, to store and supply hydraulic fluid to implement 106 or other components of machine 100.

Figure 2:
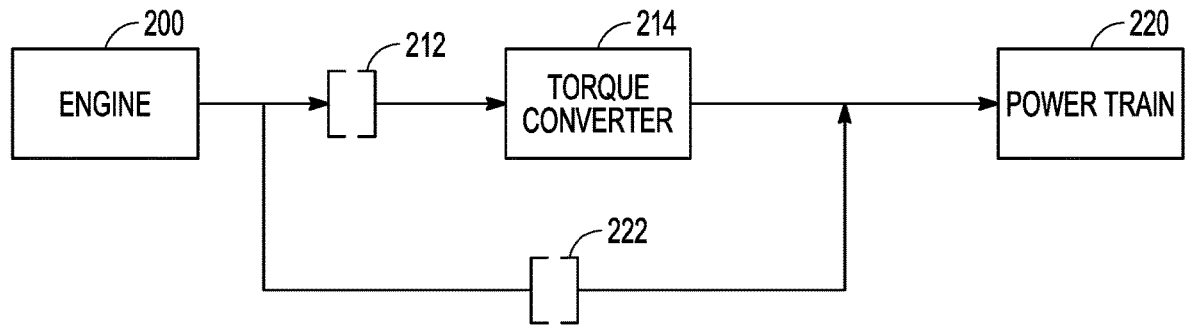
FIG. 2 is a block diagram of an impeller clutch system, in accordance with one example.

FIG. 2 is a block diagram of an impeller clutch system, in accordance with one example. The impeller clutch system includes an impeller clutch 212 between the engine 200 and the powertrain 220. The impeller clutch 212 is controlled by the impeller clutch pedal 122 (FIG. 1). By pressing the impeller clutch pedal 122, the operator sends a signal to the controller of the machine 100 to which is converted to a certain torque percentage which is then converted into allowing the impeller clutch 212 to slip so as a desired amount of torque is supplied by a torque converter 214 to the powertrain 220. The system further includes a lock-up clutch 222 which bypasses the torque converter 214 and mechanically connects the engine 200 to the powertrain 220 and bypasses the torque converter's 214 fluid coupling method. Typically, the lock-up clutch 222 is not engaged at slow speeds but when the machine speeds up the lock-up clutch 222 engages. Moreover, when the impeller clutch pedal 122 is pressed, the lock-up clutch 222 does not engage, such that the powertrain is only driven through the torque converter 214. If the lock-up clutch 222 is engaged when the impeller clutch pedal 122 is pressed, then the lock-up clutch 222 disengages.

Many large wheel loaders and other machines include an impeller clutch, such as impeller clutch 212, to disconnect engine power from the powertrain. Slipping the impeller clutch 212 allows the operator to keep the engine speed high for implement functions while not providing power to the powertrain wheels.

The use of an impeller clutch can improve machine performance but introduces opportunities for the operator to abuse the machine and its components when used inappropriately. As noted, the impeller clutch controls are primarily driven from the impeller clutch pedal 122 in the cab of the machine 100. The impeller clutch pedal 122 provides an electric signal (pedal position in terms of percent) for software controls. The impeller clutch pedal 122 is also physically linked to control pressure which is actuates the service brakes of the machine. When the impeller clutch pedal 122 is not pressed, the impeller clutch 212 is not slipping, and power is transferred from the engine 200 to the powertrain 220 through the torque converter 214.

When the impeller clutch pedal 122 is pressed it sends an electrical signal to the controller and software uses that value to determine the desired amount of impeller clutch slip. Within software, that pedal percent is translated to a desired torque percent and finally converted to a commanded pressure that achieves that torque percent. There can be a range (typically first 30-40% of travel) where the impeller clutch pedal 122 is only used for impeller clutch control. After the initial travel range, the impeller clutch pedal 122 is used for additional impeller clutch control and actuates the service brakes (less engine to powertrain power and brake power to slow/stop the machine).

Operators leverage the impeller clutch pedal 122 to reduce torque and apply service brakes when necessary to slow or stop a machine while keeping engine speed high.

However, operators have been known to use the impeller clutch 212 to disconnect the powertrain 220 from the engine 200 while descending grades. By slipping the impeller clutch 212, the operator is allowing to the machine 100 to coast down the grade without over speeding the engine 200. During these events, it is common for the operator to start by slipping the impeller clutch 212 and allowing the machine 100 to coast to speeds that exceed the normal operating conditions. Once the machine 100 reaches a speed that the operator desires, the operator further depresses the impeller clutch pedal 122 causing service brake usage to hold to that machine speed. During this event, the operator is using service brakes to slow the machine 100 while preventing the natural retarding capability of the machine (powertrain) from being used. This requires the service brakes to absorb more energy and is considered service brake abuse. Moreover, it also increases the wear on the impeller clutch 212 since it is slipping.

Examples of natural speed retarder systems include transmission retarding, and engine retarding, among other examples. For example, the engine can be used to assist the service brakes in slowing the machine's travel, because the engine output and transmission input shafts are mechanically coupled, and, as such, during an "engine braking" operation, power can be transferred from the wheels of the machine through the transmission to drive the engine. The natural resistance of the engine may dissipate some of the transferred power, thereby slowing the machine.

Moreover, some machines include an automated retarding control system that can manage machine speed on grades. These retarding controls require that the lock-up clutch 222 be engaged such that machine parasitics and retarding devices can transfer retarding power down to the wheels of the machine 100. If the impeller clutch pedal 122 is being used, the lock-up clutch 222 will typically not be engaged, and power is only transferred through the torque converter 214. Therefore, the use of an impeller clutch 212 can further reduce the amount of retarding power that can be used down to the wheels.

Operators have also been known to work around a neutral coast inhibit feature. In a neutral coast inhibit system, the system prevents the operator from shifting from an active gear into neutral when the machine is at a higher speed. However, some operators will slow the machine down below the neutral coast inhibit speed threshold before approaching a steep, long grade. They will then shift the machine into neutral and coast down the grade, using only the service brakes to manage speed. Again, this practice expects the service brakes to absorb more energy and can lead to service brake abuse and earlier wear.

Figure 3:
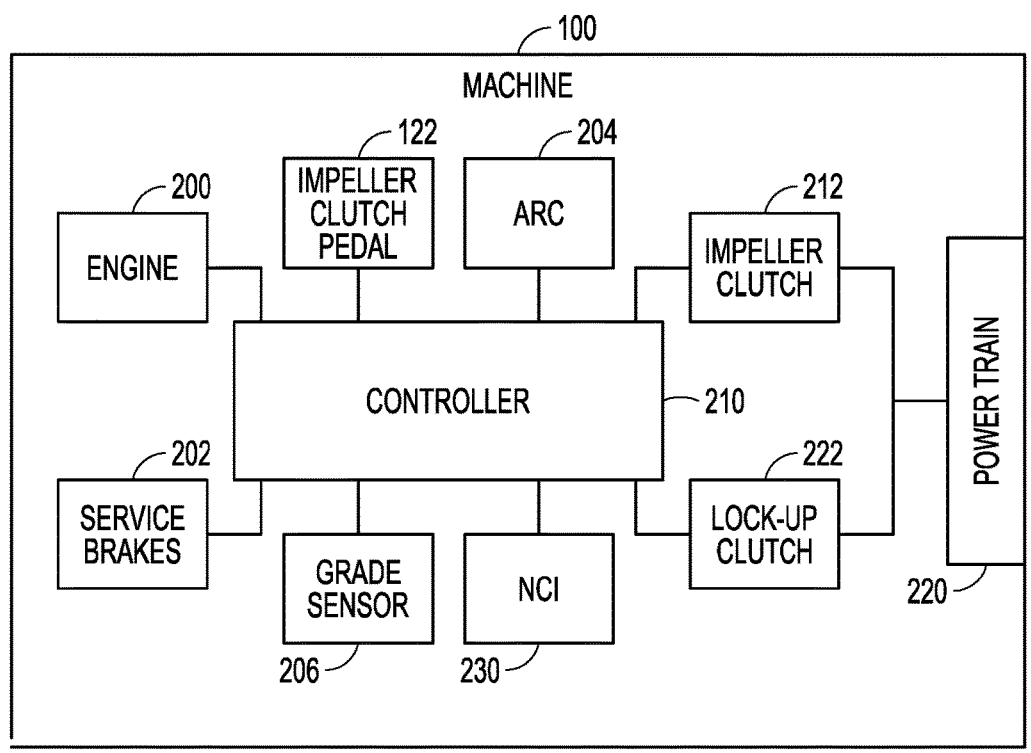
FIG. 3 is a block diagram depicting the example machine FIG. 1 and components thereof.

In light of these potential abuses, a control system has been devised to mitigate operator work-arounds and ensure proper use of the machine and its natural and automatic retarding systems FIG. 3 shows a block diagram depicting the example machine 100 and components thereof. The machine 100 includes the engine 200, the powertrain 220, the impeller clutch 212 and the lock-up clutch 222 located between the engine 200 and the powertrain 220. The machine further includes a grade sensor 206 configured to measure a grade at which the machine 100 is disposed, and a controller 210 in electrical communication with the grade sensor 206, and in communication with the other components of the machine 100, such as the impeller clutch pedal 122. The controller 210 determines if the grade is over a certain threshold. If the machine 100 is on a grade over the threshold, the controller 210 is configured to ignore any operator input to the impeller clutch 212 such that machine speed retarding is utilized to keep the machine at proper speed.

Since the impeller clutch slip is controlled in software, the controller 210 can prevent the impeller clutch pedal 122 from causing impeller clutch slip or lock-up clutch disengagement in specific scenarios.

Moreover, if the grade is over the threshold, the controller 210 does not allow the lock-up clutch 222 to be disengaged by the operator. This leads to the machine having natural or automatic retarding.

In the events described above, an operator can depress the impeller clutch pedal 122, but the controller 210 will prevent the lock-up clutch 222 from disengaging and impeller clutch 212 from slipping. By keeping the powertrain 220 engaged with the engine 200, the controller 210 reduces opportunities for brake wear/abuse and forces correct machine operation when descending a grade.

Also, if the impeller clutch pedal 122 is depressed past a given impeller clutch threshold such that service brakes 202 are further activated, the controller 210 can be configured to ignore that signal if the machine is over the threshold grade, such that if the grade is over the threshold the service brakes 202 are not activated when the impeller clutch pedal 122 is depressed passed the impeller clutch threshold.

The machine 100 can further includes a neutral coast inhibit system 230 that prevents shifting from an active gear into neutral while a speed of the machine 100 is above a set machine speed threshold. Again, if the grade is over the threshold, the controller 210 can lower the machine speed threshold of the neutral coast inhibit system 230 such that the operator cannot shift into neutral on the grade. In one example, the machine operating grade can be used to dynamically adjust the neutral coast inhibit speed threshold. Slower speeds can be set in software based on measured grade. This feature makes it more difficult for the operator to shift into neutral on a grade and abuse the machine.

The machine 100 can also include an automated retarding control system 204. In this example, if the automatic retarding control system 204 is active, the controller 210 can prevent the impeller clutch 212 from slipping and the lock-up clutch 222 from disengaging if the machine is on a specific grade, thus allowing the automated retarding controls to work as intended. Moreover, in one example, the automated retarding controls 204 can request that impeller clutch pedal commands be ignored regardless of the grade.

The grade sensor 206 measures the grade or angle (e.g., relative to horizontal) at which machine 100 is disposed. The grade sensor 206 can include a number of different types of sensors, including, for example, accelerometer, inclinometer, tilt sensor, or another sensor for determining incline, decline, change in elevation, slope, orientation, or grade of machine 100.

Figure 4:
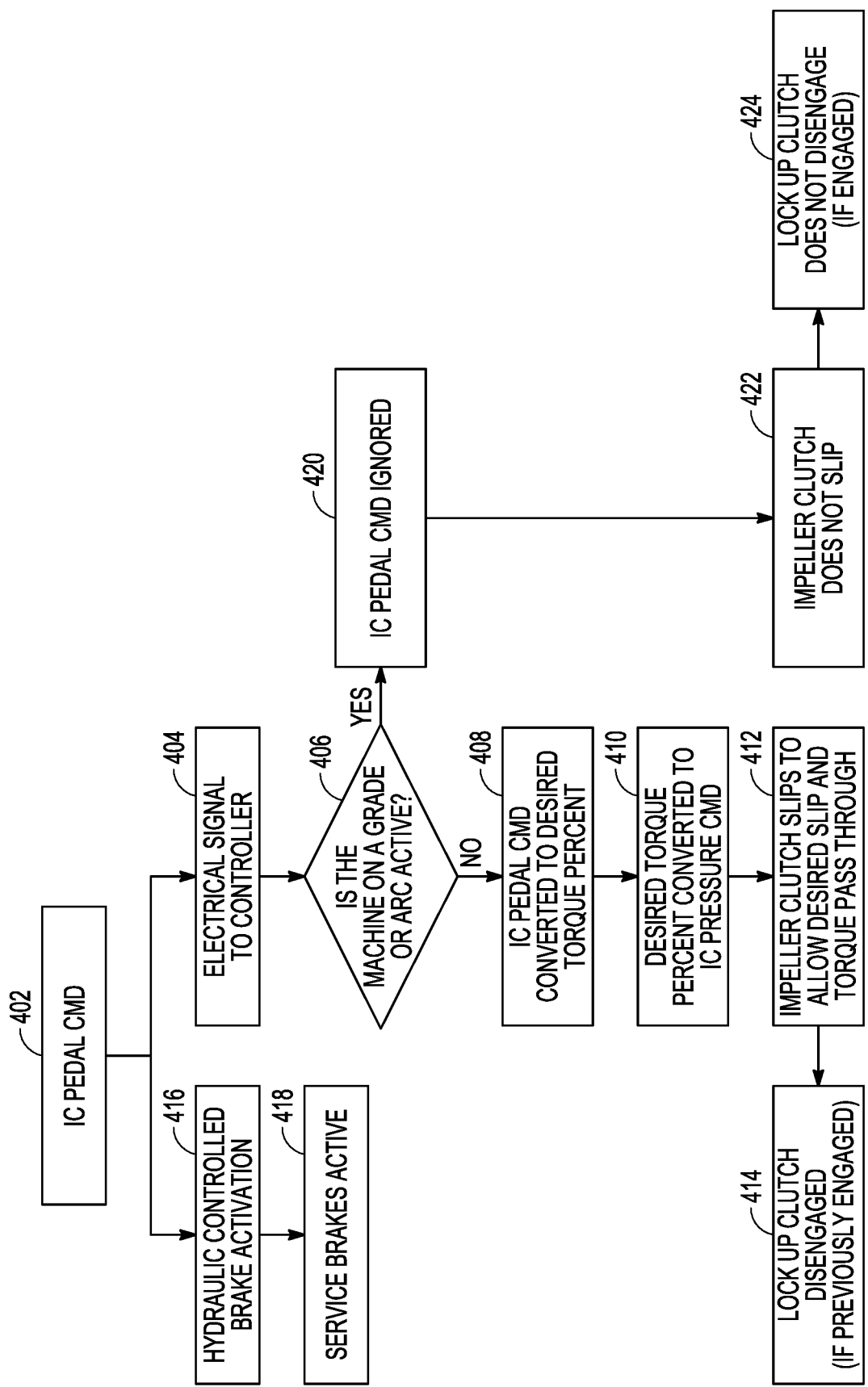
FIG. 4 shows a schematic of a control system, in accordance with one example.

FIG. 4 shows a schematic of a control system for mitigating powertrain abuse, in accordance with one example. Here at 402 the operator presses the impeller clutch pedal 122 and an impeller clutch pedal command is sent. The controller receives the command at 404. The controller determines of the machine is on a grade or if the automated retard control is active at 406. If this is not true, the controller allows the normal impeller clutch actions to be performed. Thus, the command is converted into a desired torque percent at 408 and the torque percent is converted to an impeller clutch pressure command at 410. Then the impeller clutch can then slip at 412 and the lock-up clutch is disengaged at 414.

However, if the machine is on a given grade or if the automated retarding control is active, then the controller ignores the impeller clutch pedal command at 420. This results in the impeller clutch not slipping at 422 and the lock-up clutch not disengaging at 424. Also, if the impeller clutch pedal command is ignored by the controller, the hydraulic brake activation at 416 will not activate the service brakes at 418.

Overall, the present system prevents the impeller clutch pedal from causing impeller clutch slip or lock up clutch disengagement in specific scenarios. Also, when the machine is on specific grades, automated retarding controls can request that the impeller clutch pedal commands be ignored. This impeller clutch pedal override request can be sent to the controller that determine the amount of impeller clutch slip. In such an event, an operator can depress the impeller clutch pedal and these controls will ignore the signal received from the impeller clutch and thus prevent the lock up clutch and impeller clutch from slipping.

By keeping the powertrain engaged with the engine, this feature reduces opportunities for brake wear/abuse and forces correct machine operation when descending a grade. In addition to impeller clutch pedal override capability, machine pitch/operating grade can be used to dynamically adjust the neutral coast inhibit speed threshold. Slower speeds can be set in software based on measured grade. This feature makes it more difficult for the operator to shift into neutral on a grade and abuse the machine.

INDUSTRIAL APPLICABILITY

Example machines in accordance with this disclosure can be used in a variety of industrial, construction, commercial or other applications. Example machines can be operated by an operator from a cabin of the machine. The operator can, for example, drive the machine to and from various locations on a work site, as well as between different sites, and can also pick up and deposit loads of material using a bucket implement or accomplish other tasks to which the machine and/or implements thereof are adapted.

As the machine moves from various locations, the machine may be required to traverse various grades including downhill or decline grades.

As noted above, machine operators leverage the impeller clutch pedal of certain machines to reduce torque and apply service brakes when necessary to slow or stop a machine while keeping engine speed high. However, operators have been known to use the impeller clutch 212 to disconnect the powertrain 220 from the engine 200 while descending grades. By slipping the impeller clutch 212, the operator is allowing to the machine 100 to coast down the grade without over speeding the engine 200. During these events, it is common for the operator to start by slipping the impeller clutch 212 and allowing the machine 100 to coast to speeds that exceed the normal operating conditions. Once the machine 100 reaches a speed that the operator desires, the operator further depresses the impeller clutch pedal 122 causing service brake usage to hold to that machine speed. During this event, the operator is using service brakes to slow the machine 100 while preventing the natural retarding capability of the machine (powertrain) from being used. This requires the service brakes to absorb more energy and is considered service brake abuse. Moreover, it also increases the wear on the impeller clutch 212 since it is slipping.

Figure 5:
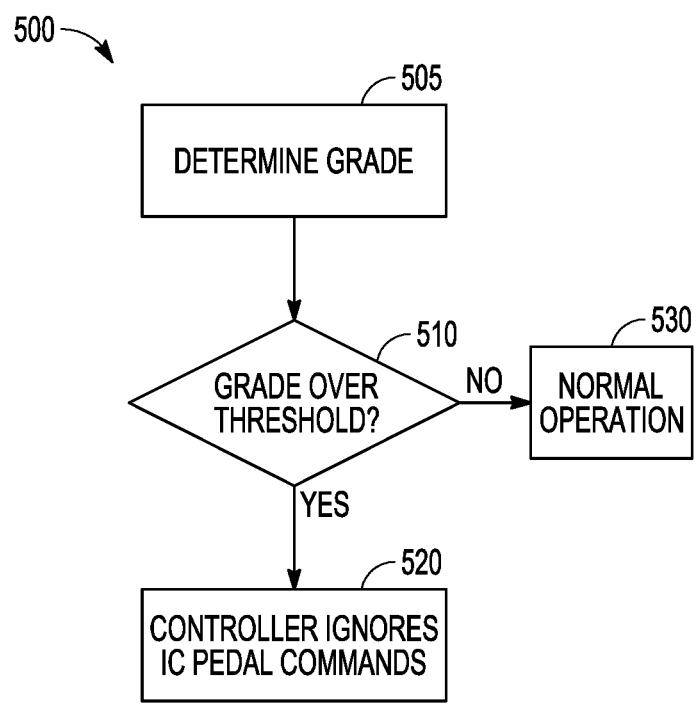
FIG. 5 is a flowchart depicting an example method of mitigating powertrain abuse, in accordance with one example.

Accordingly the present system provides a method to prevent such operator abuse, FIG. 5 shows a method 500 for mitigating powertrain abuse on a grade, the method can include determining the grade a machine 100 is on (505), and if the grade is over a threshold (510), a controller ignores (520) any operator input to the impeller clutch 212 such that machine speed retarding is utilized to keep the machine 100 at proper speed.

If the machine is not on a grade, normal operations are applied (530).

In some examples, the machine can include a neutral coast inhibit system 230 that prevents shifting from an active gear into neutral while a speed of the machine 100 is above a set machine speed threshold. In one example, if the grade is over the threshold, the machine speed threshold is lowered by the controller 210 such that the operator cannot shift into neutral on the grade.

The above detailed description is intended to be illustrative, and not restrictive. The scope of the disclosure should, therefore, be determined with references to the appended claims, along with the full scope of equivalents to which such claims are entitled.

What is claimed is:

1. A method for mitigating powertrain abuse on a grade, the method comprising:
    determining the grade a machine is on, the machine including an impeller clutch located between an engine and a powertrain so as to connect and disconnect engine power from the powertrain; and
    if the grade is over a threshold, a controller ignores any operator input to the impeller clutch such that machine speed retarding is utilized to keep the machine at a proper speed.

2. The method of claim 1, wherein the machine further includes a lock-up clutch between the engine and the powertrain, and if the grade is over the threshold, the controller does not allow the lock-up clutch to be disengaged by the operator.

3. The method of claim 1, wherein the impeller clutch is controlled by an impeller clutch pedal, and the percentage of pedal travel determines an amount of impeller clutch slippage.

4. The method of claim 3, wherein if the impeller clutch pedal is depressed passed a given impeller clutch threshold the service brakes are further activated, and the controller is configured such that if the grade is over the threshold the service brakes are not activated when the impeller clutch is depressed passed the impeller clutch threshold.

5. The method of claim 1, wherein the machine includes a neutral coast inhibit system that prevents shifting from an active gear into neutral while a speed of the machine is above a set machine speed threshold.

6. The method of claim 5, wherein if the grade is over the threshold, the controller lowers machine speed threshold such that the operator cannot shift into neutral on the grade.

7. The method of claim 1, wherein the machine speed retarding includes natural machine speed retarding.

8. The method of claim 1, wherein the machine speed retarding includes automated machine speed retarding control.

9. A system to mitigate powertrain abuse on a machine, the system comprising:
    a controller associated with the machine, the machine including an impeller clutch located between an engine and a powertrain so as to connect and disconnect engine power from the powertrain, the impeller clutch controlled by an impeller clutch pedal; and
    a grade sensor coupled to the controller;
    wherein the controller is configured such that if the grade is over a threshold, the controller ignores any operator input to the impeller clutch pedal such that the impeller clutch does not slip and machine speed retarding is utilized to keep the machine at a proper speed.

10. The system of claim 9, wherein the machine further includes a lock-up clutch between the engine and the powertrain, and if the grade is over the threshold, the controller is configured such that the lock-up clutch cannot be disengaged by the operator.

11. The system of claim 9, wherein if the impeller clutch pedal is depressed passed a given impeller clutch threshold the service brakes are further activated, wherein the controller is configured such that if the grade is over the threshold the service brakes are not activated when the impeller clutch is depressed passed the impeller clutch threshold.

12. The system of claim 9, wherein the machine includes a neutral coast inhibit system that prevents shifting from an active gear into neutral while a speed of the machine is above a set machine speed threshold, wherein if the grade is over the threshold, the machine speed threshold is lowered such that the operator cannot shift into neutral on the grade.

13. The system of claim 9, wherein the machine speed retarding can be natural machine speed retarding or be automated retarding controlled.

14. A machine comprising:
    a frame;
    an engine coupled to the frame;
    a powertrain coupled to the frame;
    an impeller clutch located between the engine and the powertrain;
    a grade sensor configured to measure a grade at which the machine is disposed; and
    a controller in electrical communication the grade sensor, the controller determining if the grade is over a threshold, wherein the controller ignores any operator input to the impeller clutch such that machine speed retarding is utilized to keep the machine at a proper speed.

15. The machine of claim 14, wherein the machine further includes a lock-up clutch between the engine and the powertrain, and if the grade is over the threshold, the controller does not permit the lock-up clutch to be disengaged by the operator.

16. The machine of claim 14, wherein the impeller clutch is controlled by an impeller clutch pedal, and the percentage of impeller clutch pedal travel determines an amount of impeller clutch slippage.

17. The machine of claim 16, wherein if the impeller clutch pedal is depressed passed a given impeller clutch threshold, machine service brakes are further activated, and the controller is configured such that if the grade is over the threshold the service brakes are not activated when the impeller clutch pedal is depressed passed the impeller clutch threshold.

18. The machine of claim 14, wherein the machine further includes a neutral coast inhibit system that prevents shifting from an active gear into neutral while a speed of the machine is above a set machine speed threshold.

19. The machine of claim 18, wherein if the grade is over the threshold, the controller lowers the machine speed threshold such that the operator cannot shift into neutral on the grade.

20. The machine of claim 14, wherein the machine speed retarding can be natural machine speed retarding or be automated retarding controlled.

* * * * *